March 29, 1966  W. E. SIMPSON  3,242,767
WINDSCREEN WIPER DRIVE MECHANISMS
Filed Oct. 3, 1963  3 Sheets-Sheet 3

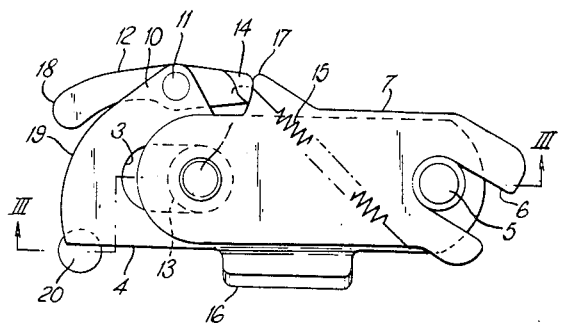
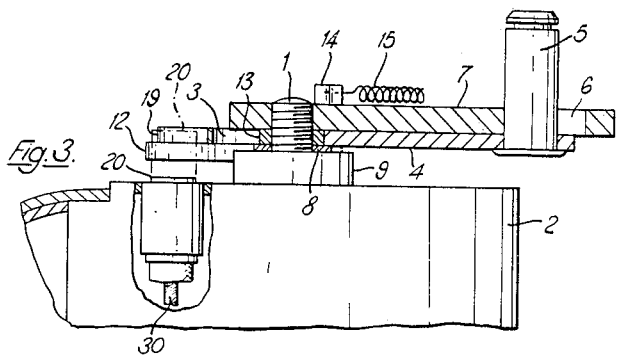
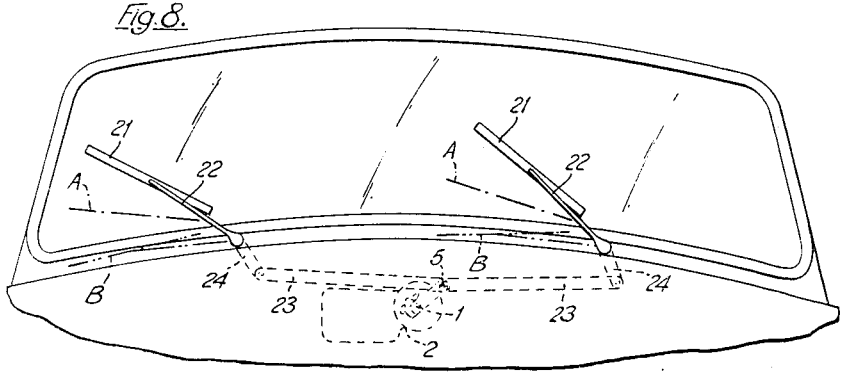

Inventor
WILLIAM E. SIMPSON
By W. E. Finken
Attorney

United States Patent Office 3,242,767
Patented Mar. 29, 1966

3,242,767
WINDSCREEN WIPER DRIVE MECHANISMS
William Edward Simpson, Oakley, England, assignor to General Motors Corporation, Detroit, Mich., a corporation of Delaware
Filed Oct. 3, 1963, Ser. No. 313,602
Claims priority, application Great Britain, Oct. 9, 1962, 38,106/62
10 Claims. (Cl. 74—600)

This invention relates to windscreen wiper drive mechanisms and in particular to a windscreen wiper drive mechanism by which the effective length of a drive crank can be increased in order to provide movement of the windscreen wiper blades to a position in which they are parked in an off screen position, that is, beyond the end of their normal stroke.

In a windscreen wiper drive mechanism according to the invention a crank member carrying a crank pin is arranged on a rotary drive shaft for rotation therewith but for movement transversely thereof, said crank member normally being secured against such transverse movement by a latch and an adjustable detent being movable into a position in which, during rotation of the crank member the latch is released by engagement with the detent and a cam surface on the crank member thereafter engages the detent to displace the crank member transversely of the drive shaft and vary the effective throw of the crank member.

Preferably the crank member carrying the crank pin is arranged for driving engagement with a second crank member which is secured on the drive shaft, the two crank members being arranged for relative sliding movement and normally secured together by said latch.

Conveniently one end of the first crank member has a slotted portion through which the drive shaft extends and its other end carries the crank pin; and one end of the second crank member is secured on the shaft and its other end has a slot through which extends the crank pin of the first crank member.

The latch is mounted on one of the crank members and conveniently comprises a pivotally mounted, spring retained pawl one end of which is engageable with said detent and the other end of which is normally engaged with an abutment on the other crank member to secure the crank members against relative sliding movement.

The location of the slot in which the crank pin is movable is preferably such that the reaction on the pin of a connector rod or like member by which drive is transmitted to the windscreen wiper arms will effect movement of the first crank arm to its normal position and reengage the latch when said detent is removed from its position of engagement with the latch.

The drive shaft is preferably driven by and forms part of an electric motor; and the movement of the detent to its position of engagement with the latch is preferably effected by or in association with the movement of a control member to switch off the motor; thus the actuation of a motor switch member may be arranged to effect simultaneous actuation of a solenoid for movement of the detent; or the motor switch member may be mechanically linked to the detent so that operation of the switch member moves the detent into its position of engagement with the latch.

Conveniently one of the crank arms carries a member which will restore the detent to its disengaged position when the motor is restarted after having been stopped and which will prevent the detent fouling other parts of the crank members before engaging the latch.

The scope of the invention is defined by the appended claims; the invention and the method by which it is to be performed are hereinafter particularly described with reference to the accompanying drawings in which:

FIGURE 2 is a plan of the drive mechanism in its assembled condition;

FIGURE 3 is a section on the line III to III of FIGURE 2, including a part of an electric windscreen wiper motor on which the mechanism is mounted;

FIGURE 8 is a diagrammatic perspective view of part of a motor vehicle with a windscreen wiper system with a drive mechanism in accordance with the invention.

Figure 1:
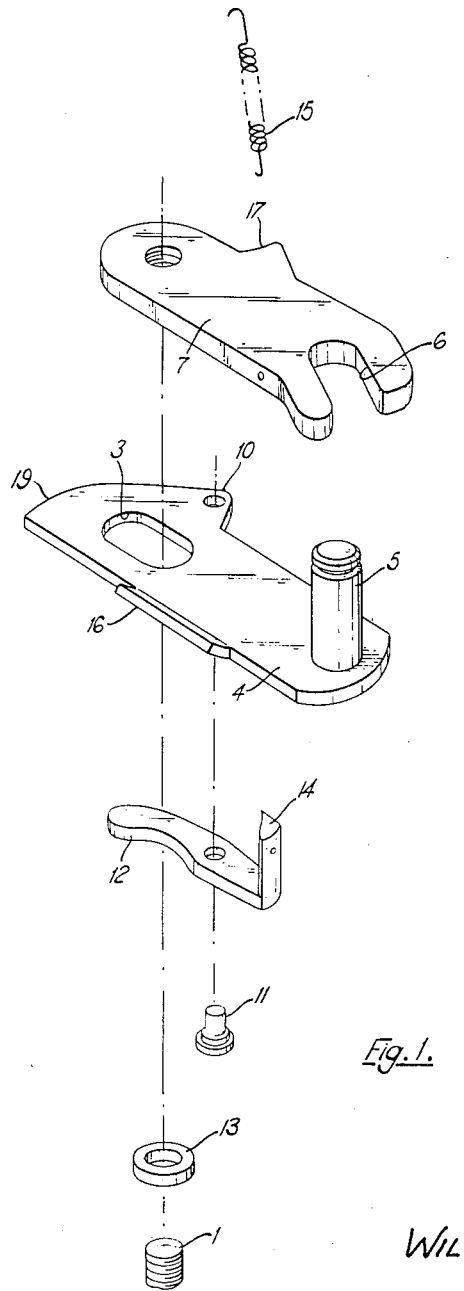
FIGURE 1 is an "exploded" perspective view of the parts of a windscreen wiper drive mechanism according to the invention.

In the windscreen wiper drive mechanism shown in the drawings the drive shaft 1 of an electric windscreen wiper motor 2 extends through a slot 3 in one end of a first crank member 4 formed as a crank arm the other end of which has secured thereon a crank pin 5 which extends through an open ended slot 6 in one end of a second crank member 7 formed as a second crank arm the other end of which is secured on the end of the drive shaft 1, conveniently by a left handed thread of the end of shaft 1 and a correspondingly threaded hole in the crank arm 7. The open-ended slot 6 extends at an angle of approximately 30° to the central longitudinal axis of the second crank arm 7. The first crank arm 4 bears against a washer 8 interposed between the crank arm 4 and a shoulder 9 which forms part of the housing of the windscreen wiper motor 2 and in which the drive shaft 1 is journalled, the crank arm 4 being retained in position by the second crank arm 7 so as to permit longitudinal movement of the first crank arm 4 relative to the second crank arm 7 within the limits determined by the length of the slot 3. This is conveniently effected by means of a distance washer 13 mounted on the shaft 1 and slidable in the slot 3.

The first crank arm 4 has at one side thereof a lateral extension 10 in which is secured a pin 11 on which a latch arm 12 is pivotally mounted; and at its opposite side the crank arm 4 has an upwardly inclined lug 16. One end of the latch arm 12 is formed with a latch tooth 14, and a spring 15 attached to said one end of the latch arm 12 and at its other end to an opposite edge of the crank member 7 is arranged so as normally to retain the latch tooth 14 in engagement with an abutment 17 which extends laterally from the second crank arm 7, so as to secure the crank arms 4, 7 against relative longitudinal movement. The tail end 18 of the latch arm 12 extends radially outwards of a cam face 19 formed on the end of the slotted portion of the crank arm 4.

The windscreen wiper motor housing carries a detent pin 20 which is axially movable parallel to the axis of the drive shaft 1 from a retracted position to an extended position (shown in dotted lines in FIGURE 3) in which it is adapted to engage the tail 18 of the latch arm 12 so as to effect pivotal movement of the latch arm 12 against the action of the spring 15 and disengage the latch tooth 14 from the abutment 17 on the second crank arm 7.

The detent pin 20 may be moved from its retracted to its extended position in any convenient manner, so that operation of a switch (not shown) to control the windscreen wiper motor 2 will effect simultaneous movement of the detent pin 20; for example the detent pin can be linked to the windscreen wiper switch by a Bowden wire connection 30 as diagrammatically shown in FIGURE 3, or by a lever; alternatively the operation of the windscreen wiper motor switch may be arranged to effect simultaneous energization of a solenoid so as to move the detent to its extended position when the windscreen wiper motor switch is operated to stop the motor 2.

Figure 5:
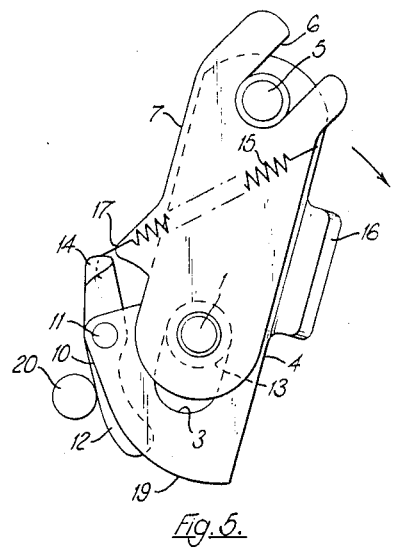
Figure 6:
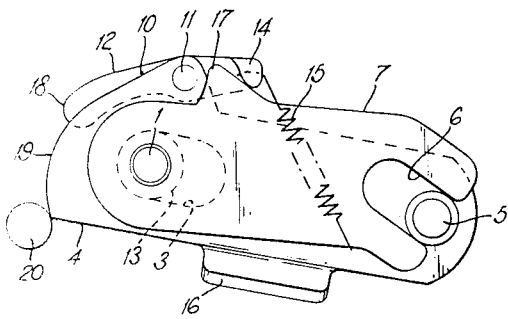

The shape of the cam face 19 on the first crank arm 4 and the relative positions of the tail end 18 of the latch arm 12 and the detent pin 20 are such that during rotation of the crank arms 4, 7 the detent will first engage the tail end 18 of the latch arm 12 so as to disengage the latch tooth 14 from the abutment 17 on the second crank arm 7 (FIGURES 4 and 5) and then initiate longitudinal movement of the first crank arm 4 relative to the second crank arm 7 by the engagement of the cam face 19 with the detent pin 20 during such rotation (FIGURE 6).

Figure 7:
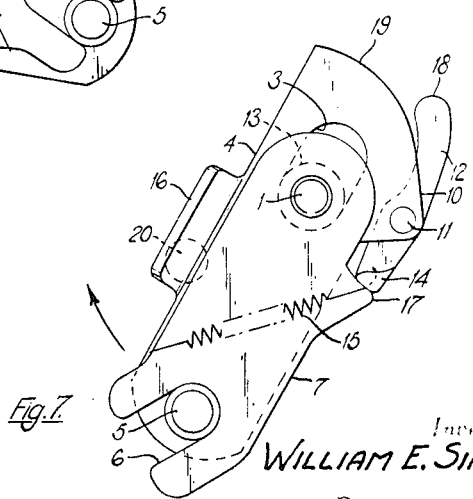

The lateral lug 16 on the side of the first crank arm opposite that carrying the latch arm 12 is arranged so as to engage the end of the detent pin 20 when the latter is in its extended position and thereby restore it to its retracted position during rotation of the crank arms 4, 7 after the detent pin 20 has cleared the cam face 19 on the first crank member (FIGURE 7). The lug 16 also prevents the detent pin 20 fouling the sides of the crank arms 4, 7 before the latch arm 12 can engage the detent pin 20.

In operation, rotation of the motor drive shaft 1 with the parts as shown in FIGURE 1 will effect rotation of the two crank arms 4, 7 with the crank pin 5 in its minimum radius position, that is, with the crank pin 5 adjacent the closed end of the slot 6 in the second crank arm 7 (FIGURE 2).

Figure 4:
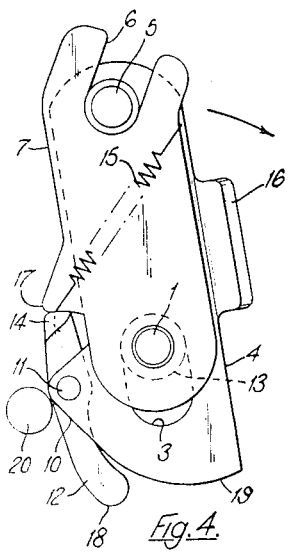
FIGURES 4, 5, 6 and 7 are plan views of the mechanism in different positions of operation.

When the detent pin 20 is moved to its extended position (shown in dotted lines in FIGURE 3) the rotation of the crank arms 4, 7 towards a position corresponding to that of the windscreen wiper blades 21 at one end of their normal strokes, as shown at A in FIGURE 3 on approaching their parked position B will bring the tail end 18 of the latch arm 12 into engagement with the detent pin 20 thereby pivoting the latch arm 12 about its pin 11 and moving the latch tooth 14 out of engagement with the abutment 17 at the side of the second crank arm 7 (FIGURES 4 and 5). Towards the end of its engagement with the tail end 18 of the latch arm 12 the detent pin 20 also engages one end of the cam face 19 on the end of the first crank arm 4 and during continued rotation of the crank arms 4, 7 the engagement of the detent 20 with the cam face 19 (FIGURE 6) effects longitudinal movement of the first crank arm 4 relative to the second crank arm 7, the slotted portion 3 of the first crank arm 4 moving longitudinally relative to the drive shaft 1 and the crank pin 5 moving in the slot 6 in the second crank arm 7 at an angle of approximately 30° to the longitudinal central axis of the second crank arm 7. This movement increases the radial distance of the crank pin 5 from the drive shaft 1 and the windscreen wiper arms 22 which are connected to the crank pin by links 23, 24 (or by any other suitable mechanism) are thereby caused to move to positions B, beyond the end of their normal strokes A, in which the windscreen wiper blades 21 are parked off the windscreen. The windscreen wiper motor 2 preferably has a control mechanism, such as that disclosed in United States Patent 3,003,098 arranged so that the current to the windscreen wiper motor 2 is switched off when the drive shaft 1 is in a position in which the crank arms 4, 7 have moved to the maximum radius position of the crank pin 5, corresponding to the off-screen parked position B of the wiper blades 21.

When the wiper motor 1 is started again the initial reaction against the crank pin 5 of the load represented by the windscreen wiper drive links 23, 24 and the windscreen wiper arms and blades 21, 22 effects longitudinal movement of the first crank arm 4 relative to the second crank arm 7 so that, as shown in FIGURE 7, the crank pin 5 is restored to its minimum radius position at the closed end of the slot 6 and at the same time the latch arm 12 is permitted to re-engage the abutment 17 on the second crank arm 7 so as to secure the crank arms 4, 7 against relative longitudinal movement. The initial rotation of the crank arms 4, 7 upon such starting of the motor 1 also effects the restoration of the detent pin 20 to its retracted position by the engagement of the end of the pin 20 by the lug 16 on the first crank arm 4. As an alternative to the above described means for restoring the first crank arm to its normal position, the first crank arm 4 could be formed with a further cam surface (not shown) adapted to engage the detent and positively return the first crank arm to its normal position in which the crank pin 5 is in its minimum radius position from the drive shaft 1.

I claim:

1. A windscreen wiper drive mechanism comprising a rotary drive shaft, a crank member, drive means interconnecting said crank member and said drive shaft for imparting rotation thereto while permitting transverse movement of said crank member relative to said drive shaft, a crank pin secured on said crank member, a latch arranged so as normally to secure said crank member against said transverse movement, a detent arranged for movement from a position out of the path of rotation of said latch to a position in the path of rotation of said latch, said detent in said latter position being engageable by said latch to release said latch, and a cam surface on the crank member engageable with the detent to displace said crank member transversely of said drive shaft to increase the effective throw of the crank member during continuous rotation thereof.

2. A drive mechanism according to claim 1, in which the drive means interconnecting said crank member and said drive shaft comprises a second crank member secured on said drive shaft, said crank members being arranged for relative sliding movement but being normally secured against such movement by said latch.

3. A windscreen wiper drive mechanism according to claim 2, in which one end of the first crank member has a slotted portion through which said drive shaft extends and the other end of said first crank member carries said crank pin.

4. A windscreen wiper drive mechanism according to claim 3, in which said second crank member is secured at one end thereof on said shaft and at its other end has a slot through which extends the crank pin on said first crank member.

5. A windscreen wiper drive mechanism according to claim 4, in which the slot in said other end of the second crank member extends at an angle of approximately 30° to the longitudinal axis of said second crank member.

6. A windscreen wiper drive mechanism according to claim 5, in which said latch comprises a pivotally mounted spring retained pawl one end of which is engageable with said detent and the other end of which is normally engaged with an abutment on said second crank member to secure the crank members against relative sliding movement.

7. A windscreen wiper drive mechanism according to claim 6, in which said first crank member has thereon a lug arranged so as, during rotation of said crank member to restore said detent to its disengaged position.

8. A windscreen wiper drive mechanism according to claim 4, in which the slot in said other end of the second crank member extends at such an angle to the longitudinal axis of said second crank member that rotation of the crank member with a load on said crank pin applies a force to said first crank member to restore it to its normal position after engagement with said detent.

9. A windscreen wiper drive mechanism comprising an electric motor with a rotary drive shaft, a crank member, drive means interconnecting said crank member and said drive shaft for imparting rotation thereto while permitting transverse movement of said crank member relative to said drive shaft, said crank member having a cam surface on one end thereof, a crank pin secured on said crank member, a latch arranged so as normally to secure said crank member against said transverse movement, a detent arranged for movement from a position out of the path of rotation of said latch to a position in the path of rotation of said latch, said detent in said latter position being engageable by said latch to release said latch and said cam surface on the crank member thereafter engages the detent to displace said crank member transversely of said drive shaft to increase the effective throw of the crank member during continuous rotation thereof, and means arranged to effect conjoint control of said detent and said motor so that when the motor is stopped the crank member is in its maximum throw position.

10. A windscreen wiper drive mechanism comprising an electric motor with a rotary drive shaft; a first crank member having at one end thereof a slotted portion mounted on said drive shaft but movable transversely thereof and having at its other end a crank pin secured thereto; a second crank member having at one end thereof an open-ended slot through which extends said crank pin, and having its other end secured on said drive shaft, said second crank member having at one side thereof a laterally extending abutment; a latch pawl pivotally mounted on said first crank member and having one end thereof pressed by a spring into engagement with said abutment so as to secure said crank members against relative sliding movement transversely of said shaft and having the other end thereof arranged so as normally to extend beyond a cam surface at the end of the first crank member adjacent the slotted portion thereof; and an adjustable detent arranged for movement from a retracted position to an extended position in which, during rotation of said crank members said other end of the latch pawl is engaged by said detent so as to disengage said one end of the latch pawl from said abutment and said cam surface on the first crank member thereafter engages said detent to displace the first crank member transversely of said drive shaft and move said crank pin in the open-ended slot of the second crank member to increase the effective throw of said first crank member.

References Cited by the Examiner
UNITED STATES PATENTS 3,003,098    10/1961    Simpson _____ 318—466

FOREIGN PATENTS 877,354    9/1961    Great Britain.

BROUGHTON G. DURHAM, *Primary Examiner.*

W. S. RATLIFF, JR., *Assistant Examiner.*